| United States Patent [19] | [11] Patent Number: 4,980,200 |
| Takahashi et al. | [45] Date of Patent: Dec. 25, 1990 |

[54] METHOD OF PRODUCING PRINTED CONTAINERS FOR RETORTABLE MATERIALS

[75] Inventors: Takeshi Takahashi; Yoshitsugu Hamada, both of Kanagawa, Japan

[73] Assignee: Showa Denko Kabushiki Kaisha, Tokyo, Japan

[21] Appl. No.: 278,129

[22] Filed: Nov. 30, 1988

[30] Foreign Application Priority Data

Nov. 30, 1987 [JP] Japan .................................. 62-302169

[51] Int. Cl.$^5$ ............................ B05D 3/08; B05D 5/04
[52] U.S. Cl. ..................................... 427/223; 427/256
[58] Field of Search ................. 427/223, 256, 261, 316

[56] References Cited

U.S. PATENT DOCUMENTS

| 3,317,339 | 5/1967 | Fortner et al. | 427/223 |
| 3,335,022 | 8/1967 | Sincock | 427/223 |
| 4,339,485 | 7/1982 | Shibano et al. | 428/500 X |

*Primary Examiner*—Evan Lawrence
*Attorney, Agent, or Firm*—Sughrue, Mion, Zinn, Macpeak & Seas

[57] ABSTRACT

A method of producing printed containers for retortable material comprising subjecting the outer surfaces of sheets or container of polyolefin to a flame treatment to produce a wet index of 45 dyne/cm or higher and then printing the outer surfaces. The polyolefin used comprises an olefin polymer compound comprising a mixture of (a) 100 parts by weight of a crystalline propylene polymer having a melt flow index of 0.1–100 g/10 min and (b) 3.0–30 parts by weight of an ethylene polymer having a density of 0.925–0.975 g/cc and a melt index of 0.1–20 g/10 min; or an olefin polymer compound comprising a mixture of (a) 100 parts by weight of a crystalline propylene polymer having a melt flow index of 0.1–100 g/10min, (b) 3.0–30 parts by weight of an ethylene polymer having a density of 0.925–0.975 g/cc and a melt flow index of 0.1–20 g/10 min, and (c) 2.0–25 parts by weight of an ethylene-propylene copolymer rubber having a Mooney viscosity (ML 1+4·100° C.) of 140 or less and containing 20–70 weight percent propylene.

2 Claims, No Drawings

METHOD OF PRODUCING PRINTED CONTAINERS FOR RETORTABLE MATERIALS

FIELD OF THE INVENTION

The present invention relates to a method of producing printed vessels for retortable matters such as retortable foods or the like, and particularly relates to a method of producing printed vessels for retortable matters in which an excellent print fixation property is obtained even after retort treatment.

BACKGROUND OF THE INVENTION

Conventionally, an ethylene polymer, a propylene polymer, a polymer of ethylene or propylene and an other olefin, or the like has been generally broadly used as resin for food containers.

Recently, so-called boilable foods capable of being warmed in boiling water in a container in which the foods are packed have been particularly popularized, and the foregoing resin has been used for containers for such retortable foods.

Containers for such materials such as foods are printed in a predetermined manner. For example, container of a final shape or sheets to be formed into the containers are prepared and then subjected to a print coating treatment so that names and features of foods are specified and/or colors or patterns are applied to improve the aesthetics of the containers.

However, since olefin polymers to be used for the printed containers for retortable materials are non-polar and crystalline, they generally are chemically inert. Moreover, the solubility thereof against various solvents is low because of their high crystallinity. Consequently, printed containers for retortable materials utilizing such olefin polymers have poor retort-resistant property, that is, the affinity between printing ink and the polymer is so poor that the property of printing and coating on container surfaces is low and the adhesion of printed characters or patterns onto the container surface is weak. Accordingly, the printed characters and/or patterns tend to be easily separated from the container surface.

In order to improve the printing and coating properties as well as the print adhesion properties, a method has been proposed in which the polarity of the resin for forming containers is enhanced by adding a polymer or inorganic material having a polar group to the resin, and a method in which the affinity between printing ink and the resin is improved by a surface treatment such as corona discharge treatment, flame treatment or the like are known.

In conventional printed containers for retortable materials of the foregoing olefin polymers, however, it has not been possible even with the the above methods to sufficiently improve the printing and coating properties of the container surface. Moreover, it has been difficult to obtain excellent print adhesion properties in which printed characters and/or patterns do not separate from the container through the retort treatment. Therefore, at present, printed retort containers in which the retort-resistant property is excellent and on which printing can be performed are not commercially available.

SUMMARY OF THE INVENTION

Therefore, an object of the present invention is to solve the foregoing problems of the prior art and to provide a method of producing printed containers for retortable materials in which the printing and coating properties as well as the print adhesion property are excellent and the so-called retort-resistant property is superior, that is, printed characters and/or patterns are not separated from vessel surfaces even by the retort treatment.

Accordingly, the present invention provides a materials comprising subjecting the outer surfaces of sheets or containers of polyolefin to flame treatment to produce a wet index of 45 dyne/cm or higher according to the JIS K 6768 test and then printing the outer surfaces, wherein the polyolefin is (1) and olefin polymer compound formed of a mixture of (a) 100 parts by weight of a crystalline propylene polymer having a melt index of 0.1–100 g/10 min and (b) 3.0–30 parts by weight of an ethylene polymer having density of 0.925–0.975 g/cc and a melt index of 0.1–20 g/10 min; or (2) an olefin polymer compound formed of a mixture of (a) 100 parts by weight of a crystalline propylene polymer having a melt index of 0.1–100 g/10 min, (b) 3.0–30 parts by weight of an ethylene polymer having a density of 0.925–0.975 g/cc and a melt index of 0.1–20 g/10 min, and (c) 2.0–25 parts by weight of an ethylene-propylene copolymer rubber having a Mooney viscosity (ML 1+4·100° C.) of 140 or less according to the JIS K 6300 test and containing 20 to 70 weight percent propylene.

DETAILED DESCRIPTION OF THE INVENTION

The method of producing printed vessels for retortable matters according to the present invention is described in detail hereunder.

Preferred propylene polymers (a) used in the present invention, are crystalline polymers including homopolymers of propylene or copolymers of propylene and an other olefin. Preferred olefins include ethylene or an α-olefin containing 4–12 carbon, such as butene-1, hexene-1, 4-methylpentene-1, octene-1, or the like. The other olefin is preferably present so as to form a random or block copolymer of the olefin and propylene. Generally, it is preferable that the copolymerization amount of the other olefin in the copolymer of propylene and the olefin is 25 weight percent or less. The melt flow index (hereinafter, abbreviated to "MFI") of the propylene polymer is 0.1–100 g/10 min, preferably, 0.1–50 g/10 min. If the MFI is lower than 0.1 g/10 min, the molding property of the polymer compound is so poor that molding cannot be performed and event if molding can be performed, the strength of the molded vessels is insufficient. If the MFI exceeds 100 g/10 min, the flowability of the compound is so high that molding cannot be performed.

Further, as the ethylene polymer (b) according to the present invention, a polymer of ethylene or a random or block copolymer of ethylene and an other olefin can be used. Preferred olefins to be used with the ethylene include α-olefins containing 12 carbons or less, such as propylene, butene-1, hexene-1, 4-methylpentene-1, octene-1, or the like. Preferably the copolymerization amount of the other olefin in the copolymer of ethylene and the olefin is generally 20 weight percent or less, more preferably 15 weight percent or less. It is preferable that the density of the ethylene polymer is 0.925–0.975 g/cc, more preferably, 0.950–0.960 g/cc, and that the melt index (hereinafter, abbreviated to "MI") of the ethylene polymer is 0.1–20 g/10 min, more preferably, 0.5–10 g/10 min. If the MI is lower than 0.1 g/10 min, the flowability of the polymer compound is so poor that the polymer compound does not have a uniform composition, while if the MI exceeds 20 g/10 min, the flowability of the compound is so high that the molding property there of is inferior. The proportion of the ethylene polymer is 3.0–30 parts by weight relative to 100 parts by weight of the propylene polymer.

As the ethylene-propylene copolymerization rubber (c) which can be used in the present invention, a block or random copolymer having a Mooney viscosity (ML 1+4·100° C.) of 140 or less and containing propylene in an amount of 20–70 weight percent is preferred. The proportion of the ethylene-propylene copolymerization rubber is 2.0–2.5 parts by weight relative to 100 parts by weight of the propylene polymer.

In production of the printed containers for retortable materials according to the present invention, first, a polymer compound is obtained by mixing the foregoing propylene polymer, ethylene polymer, and ethylene-propylene copolymerization rubber in the proportions described above. If desired, an inorganic additive, an antistatic agent, a pigment, and the like can be added to the mixture, and then the mixture is well blended through dry blending and/or melt kneading.

The polymer compound is (1) an olefin polymer compound formed by mixing 100 parts by weight of propylene polymer (a) and 3–30 parts by weight ethylene polymer (b) or (2) an olefin polymer compound formed by mixing 100 parts by weight of propylene polymer (a), 3–30 parts by weight ethylene polymer (b), and 2.0–25 parts by weight of ethylene-propylene copolymerization rubber (c). Further, the dry blending can be carried out using a ribbon blender or the like, and the melt-kneading can be carried out using an extruder or the like generally at a resin temperature of about 230°–260° C.

Containers each having a predetermined shape or sheets for producing containers are prepared through injection molding, blow molding, or the like. For example, injection molding can be carried out using an injection molding machine of about 60 Oz at a temperature at which the resin temperature is 250° C. to thereby obtain the sheets. Further, containers each having a thickness of about 2 mm and a desired shape, for example, a bag shape, a box shape, a cylindrical shape or the like, are formed of the sheets.

Then, the surfaces of the thus-obtained sheets or containers are subjected to a flame treatment to provide the surface with a wet index of 45 dyne/cm or higher. In the flame treatment, the flame is contacted with the container or sheet surface for a extremely short time to oxidize the molecules in the surface layer of the container or sheet to thereby increase the polarity of the surface layer. This improves the affinity between the printing ink and the container or sheet surface so that solid printing can be performed on the sheets or containers, and the effects of the treatment can be obtained continuously and efficiently. In addition to the above methods, surface treatment can be carried out using a plasma treatment method, and ozone treatment method, a corona discharge treatment method, or the like. Those surface treatment methods are disadvantageous, however, because a sufficient effect can not be obtained.

Further, if the surface wet index is lower that 45 dyne/cm, the affinity between the printing ink and the resin cannot be increased and therefore it is impossible to obtain sufficient printing properties and sufficient print adhesivity.

Next, characters and/or patterns specifying the name and features of the foods or for adding aesthetic design features are rapidly printed on the outer surfaces of the sheets or containers which have been subjected to the surface treatment to render the surface wet index 45 dyne/cm, or higher. The printing is generally performed using a conventional printing machine, a curved-surface printing machine, or the like, using gravure printing, silk-screen printing, offset printing, transfer printing, or the like.

Suitable printing inks include UV-setting inks, permeation inks, oxidation-polymerization inks, evaporation inks, or the like. These inks contain a suitable pigment mixed with a vehicle such as a resin, a solvent, or the like and have the desired color. In view of the solidity and adhesion of the printed characters and/or patterns obtained onto the container surface, or workability, it is preferable to use a UV-setting ink including a resin which can be hardened through UV irradiation. For example, an ink formed by mixing a dye or a pigment with a urethane resin, a acryl resin, or the like can be used.

The thus prepared containers on which printing has been conducted are used as "printed containers for retortable materials". Further, the thus prepared sheets on which printing has been conducted are formed into a desired shape, such as a bag shape, a box shape, a cylindrical shape, or the like having a thickness of about 2 mm.

The method of producing printed containers for retortable materials according to the present invention comprises the steps of: mixing (1) a polymer compound comprising a mixture of (1) propylene polymer (a) and ethylene polymer (b) in the proportions set forth herein or (2) a polymer compound comprising propylene polymer(a), ethylene polymer (b), and ethylene-propylene copolymerization rubber (c) in the proportions set forth herein; flame treating the prepared polymer compound to have a surface wet index of 45 dyne/cm or higher; and printing the surface of the flame-treated polymer compound before the numerical value of the wet index decreases. Therefore, the affinity between the printing ink and the container or sheet surface can be improved so that the printing and coating properties are improved, the adhesion property of the printed characters and/or patterns on the container or sheet surface is increased, and printed containers for retortable materials in which the printed characters and/or patterns do not separate from the container surfaces even through retort treatment can be obtained.

Further, in the printed containers for retortable materials produced by the method according to the present invention, since the polymer component forming the containers contains propylene polymer (a) and ethylene polymer (b) as principal components, advantageously the printed containers are superior not only in heat-resistant properties, hardness, and surface gloss properties but also in the cold-resistance properties and shock-resistant properties.

Examples (eight) according to the present invention and comparison examples (four) were produced using polymer compounds formed in accordance with the proportions shown in Table 1 below.

Crystalline polypropylene having an MI of 10 g/10 min, and polyethylene having density of 0.951 g/cc and an MI of 0.80 g/10 mmin were used. A random copolymer having a Mooney viscosity (ML 1+4·100° C.) of 80 and containing 30 weight percent propylene was used as the ethylene-propylene copolymerization rubber. A copolymer containing butene-1 in an amount of 2 weight percent and having an MI of 10 g/10 min was used as the propylene-butene random copolymer. A copolymer containing butene-1 in an amount of 2 weight percent and having a density of 0.93 g/cc and an MI of 12 g/10 min was used as the ethylene-butene random copolymer.

These polymers were mixed in the proportions shown in Table 1 below, and blended with each other by dry blending using a ribbon blender for 10 minutes to thereby prepare polymer compounds. Next, the thus prepared polymer compounds were melt-kneaded at a temperature at which the resin temperature was 220° C. and extruded using an extruder (50 mmφ) having a vent so that the polymer compounds were pelletized.

Next, the pelletized polymer compounds were injection molded using an injection molding machine of 5 Oz at a temperature at which the resin temperature was 230° C. to thereby produce cylindrical containers each having a thickness of 1.5 mm, a body diameter of 50 mmφ, and a height of 40 mmH and having a tapered bottom portion with a taper angle of 10°.

Next, the surfaces of the vessels were subjected to flame treatment. The flame treatment was performed in such a manner that the vessels were passed through a flame at a temperature of 750° C. by combustion of propane gas for about 0.4 seconds. Table 1 shows the wet indices of the container surfaces after the flame treatment.

Next printing was performed with four colors on the surfaces of the containers of the examples of the present invention (8 examples) and comparative examples (4 examples) as shown in Table 1 by using a curved-surface printing machine (made by FUJI MACHINERY CO., LTD.). The printing ink used as a UV-setting ink (tradename: DFC-6, made by TOYO INK MANUFACTURING CO., LTD.) in which a pigment was mixed in a UV-setting resin.

The thus produced printed containers were subjected to a retort treatment, and then a separation test was carried out on the printed containers to measure the print adhesion.

The retort treatment was printed containers immersing the for 40 minutes in a constant-pressure treatment cell heated to 121° C. The separation test was performed by adhering a commercially available adhesive lap over the printed characters and/or patterns on the container surface after the retort treatment and then removed from the container surface. The print adhesion property was evaluated on the bases of the degree to which the printed characters and/or patterns were separated from the surface and adhered to the adhesive lap. Table 2 shows the results of print adhesion property, in which the symbols "○", "Δ" and "×" represent the degree of print adhesive property in descending order.

TABLE 1

| Sample No. | Propylene Polymer Kind | Parts by Weight | Ethylene Polymer Kind | Parts by Weight | Ethylene-Propylene Copolymer Rubber Kind | Parts by Weight | Surface Wet Index (dyne/cm) |
|---|---|---|---|---|---|---|---|
| Examples of the Invention | | | | | | | |
| 1 | Polypropylene | 100 | Polyethylene | 10 | — | — | 48 |
| 2 | Polypropylene | 100 | Polyethylene | 20 | — | — | 48 |
| 3 | Polypropylene | 100 | Polyethylene | 20 | — | — | 48 |
| 4 | Polypropylene | 100 | Polyethylene | 30 | — | — | 48 |
| 5 | Polypropylene | 100 | Polyethylene | 20 | Ethylene-propylene random copolymer rubber | 10 | 47 |
| 6 | Polypropylene | 100 | Polyethylene | 20 | Ethylene-propylene random copolymer rubber | 5 | 47 |
| 7 | Propylene-butene-1 random copolymer | 100 | Polyethylene | 30 | — | — | 47 |
| 8 | Polypropylene | 100 | Ethylene-butene-1 random copolymer | 20 | — | — | 47 |
| Comparative Examples | | | | | | | |
| 9 | Polypropylene | 100 | — | — | — | — | 45 |
| 10 | — | — | Polyethylene | 100 | — | — | 45 |
| 11 | Polypropylene | 100 | Polyethylene | 20 | Ethylene-propylene random copolymer rubber | 30 | 45 |
| 12 | Polypropylene | 100 | Polyethylene | 20 | Ethylene-propylene random copolymer rubber | 10 | 35 |

TABLE 2

| Examples of the Invention | Print-stickness |
|---|---|
| 1 | Δ |
| 2 | O |
| 3 | Δ |
| 4 | O |
| 5 | O |
| 6 | O |
| 7 | O |
| 8 | O |
| Comparative examples | |
| 9 | X |
| 10 | X |
| 11 | X |
| 12 | X |

As can be seen from the results in Table 2, all of the printed containers for retortable materials of the examples of the present invention had superior print adhesive property to those of the comparative examples. In the containers of Comparative Examples 9 and 10 in which the containers were formed of only propylene polymer and only ethylene polymer, respectively, in Comparative Example 11 in which the proportion of one of the propylene polymer (a), the ethylene polymer (b), and the ethylene-propylene copolymerization rubber (c) was out of the range according to the present invention, and in Comparative Example 12 in which the surface wet index of the container surface was out of the range according to the present invention although the proportions of the polymers were within the range according to the present invention, the print adhesive property of the containers was low and therefore sufficient retort-resistant property was not obtained.

As described above, the method of producing printed containers for retortable materials in which the outer surfaces of sheets or containers of polyolefin are subjected to flame treatment to render their wet index 45 dyne/cm or higher and then the outer surfaces are printed, according to the present invention, and where the polyolefin used is: (1) an olefin polymer compound comprising mixture of (a) 100 parts by weight of a crystalline propylene polymer having a melt index of 0.1-100 g/10 min and (b) 3.0-30 parts by weight of an ethylene polymer having a density of 0.925-0.975 g/cc and a melt index of 0.1-20 g/10 min; or (2) an olefin polymer compound comprising a mixture of (a) 100 parts by weight of a crystalline propylene polymer having a melt index of 0.1-100 g/10 min(b), 3.0-30 parts by weight of an ethylene polymer having a density of 0.25-0.975 g/cc and a melt index of 0.1-20 g/10 min, and (c) 2.0-25 parts by weight of an ethylene-propylene copolymer rubber having a Mooney viscosity (ML 1+4·100° C.) or less and containing 20-70 weight percent propylene provides advantageous results. Therefore, it is possible to obtain printed containers for retortable materials in which not only is the affinity between the printing ink and the container surface high and the printing and coating is superior, but also the adhesive property of the printed characters and/or patterns on the container surface is so good that the retort-resistance property is superior and the printed characters and/or patterns do not separate from the container surfaces even through the retort treatment.

What is claimed is:

1. A method of producing printed containers for retortable materials comprising subjecting the outer surfaces of sheets or containers of polyolefin to a flame treatment to produce a wet index of 45 dyne/cm or higher according to the JIS K 6768 test and then printing said outer surfaces, wherein said polyolefin comprises
   (1) an olefin polymer compound comprising a mixture of (a) 100 parts by weight of a crystalline propylene polymer having a melt flow index of 0.1-100 g/10 min and (b) 3.0-30 parts by weight of an ethylene polymer having a density of 0.925-0.975 g/cc and a melt index of 0.1-20 g/10 min; or
   (2) an olefin polymer compound comprising a mixture of (a) 100 parts by weight of a crystalline propylene polymer having a melt flow index of 0.1-100 g/10 min, (b) 3.0-30 parts by weight of an ethylene polymer having a density of 0.925-0.975 g/cc and a melt flow index of 0.1-20 g/10 min, and (c) 2.0-25 parts by weight of an ethylene-propylene copolymer rubber having a Mooney viscosity (ML1+4·100° C.) of 140 or less according to the JIS K 6300 test and containing 20-70 weight percent propylene.

2. A method of producing printed containers for retortable materials comprising subjecting the outer surfaces of sheets or containers of polyolefin to a flame treatment to produce a wet index of 45 dyne/cm or higher according to the JIS K 6768 test and then printing said outer surfaces, wherein said polyolefin comprises
   (1) an olefin polymer compound comprising a mixture of (a) 100 parts by weight of a crystalline propylene polymer having a melt flow index of 0.1-100 g/10 min and (b) 3.0-30 parts by weight of an ethylene polymer having a density of 0.925-0.975 g/cc and a melt index of 0.1-20 g/10 min; or
   (2) an olefin polymer compound comprising a mixture of (a) 100 parts by weight of a crystalline propylene polymer having a melt flow index of 0.1-100 g/10 min, (b) 3.0-30 parts by weight of an ethylene polymer having a density of 0.925 -0.975 g/cc and a melt flow index of 0.1-20 g/10 min, and (c) 2.0-25 parts by weight of an ethylene-propylene copolymer rubber having a Mooney viscosity (ML 1+4·100° C.) of 80 according to the JIS K 6300 test and containing 20-70 weight percent propylene.

* * * * *